United States Patent
Vituri et al.

(10) Patent No.: US 9,625,029 B2
(45) Date of Patent: Apr. 18, 2017

(54) GASKET WITH A BAFFLE

(71) Applicant: GM Global Technology Operations LLC, Detroit, MI (US)

(72) Inventors: Mauricio C. Vituri, Sao Bernardo Do Campo (BR); Ricardo Castro, São Paulo (BR)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/026,290

(22) Filed: Sep. 13, 2013

(65) Prior Publication Data

US 2015/0075322 A1    Mar. 19, 2015

(51) Int. Cl.

| | | |
|---|---|---|
| *F16H 57/04* | (2010.01) | |
| *F16H 57/029* | (2012.01) | |
| *F16J 15/06* | (2006.01) | |
| *F16H 63/00* | (2006.01) | |
| *F16H 57/027* | (2012.01) | |

(52) U.S. Cl.
CPC .......... *F16H 57/029* (2013.01); *F16J 15/064* (2013.01); *F16H 57/027* (2013.01); *F16H 2063/005* (2013.01); *Y10T 74/2186* (2015.01)

(58) Field of Classification Search
CPC .............................. F16H 57/029; F16J 15/064
USPC ........................ 74/606 R; 277/590, 591, 599
See application file for complete search history.

(56) References Cited

U.S. PATENT DOCUMENTS

| | | | |
|---|---|---|---|
| 1,595,020 A * | 8/1926 | Nadler .......................... 74/606 A |
| 2,155,457 A * | 4/1939 | West .............................. 524/321 |
| 4,606,238 A * | 8/1986 | Ikemoto et al. ........... 74/473.29 |
| 5,022,662 A * | 6/1991 | Yasui .............................. 277/599 |
| 5,310,198 A * | 5/1994 | Belter ........................... 277/599 |
| 6,662,791 B2 * | 12/2003 | Nakamizo et al. ........... 123/572 |
| 7,866,231 B2 * | 1/2011 | Kincaid et al. ................. 74/607 |
| 2005/0279295 A1 * | 12/2005 | Vialard et al. ............. 123/41.74 |
| 2008/0223349 A1 * | 9/2008 | Uenomaya et al. ........ 123/65 V |
| 2012/0091384 A1 * | 4/2012 | Hoppe ........................... 251/357 |

FOREIGN PATENT DOCUMENTS

JP    08189326 A    *    7/1996

* cited by examiner

*Primary Examiner* — Vicky Johnson

(57) ABSTRACT

A gasket for a motor vehicle transmission includes an outer band that defines an inner open region. The outer band includes an enlarged portion where a baffle is located. The baffle prevents or minimizes the escape of hydraulic fluid from the transmission during the operation of the transmission.

9 Claims, 3 Drawing Sheets

GASKET WITH A BAFFLE

FIELD

The present disclosure relates to a gasket. More specifically, the present disclosure relates to a baffled gasket for a transmission.

BACKGROUND

The statements in this section merely provide background information related to the present disclosure and may or may not constitute prior art.

A typical manual transmission for a motor vehicle includes a shift tower mounted on a housing of the transmission, and the shift tower is coupled to a shift assembly that is operated by a driver residing in the motor vehicle. When the driver makes a gear selection by transmitting motion to a shift lever associated with the shift assembly, the movement of the shift lever is transmitted to the shift tower, resulting in a gear change. During the operation of the transmission, hydraulic fluid is circulated within the transmission to dissipate heat and to lubricate the components. In certain arrangements, a vent is associated with the shift tower to compensate for the thermal expansion of air inside the transmission housing. In such arrangements, hydraulic fluid may be expelled through the vent during the operation of the transmission.

Hence there is a need for an improved venting process associated with a transmission shift tower.

SUMMARY

A gasket for a motor vehicle transmission includes an outer band that defines an inner open region. The outer band includes an enlarged portion where a baffle is located. The baffle prevents or minimizes the escape of hydraulic fluid from the transmission during the operation of the transmission.

In particular arrangements, the gasket both seals against leakage from a transmission housing and prevents splashing hydraulic fluid within the transmission housing from leaking out of a vent.

Further features, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
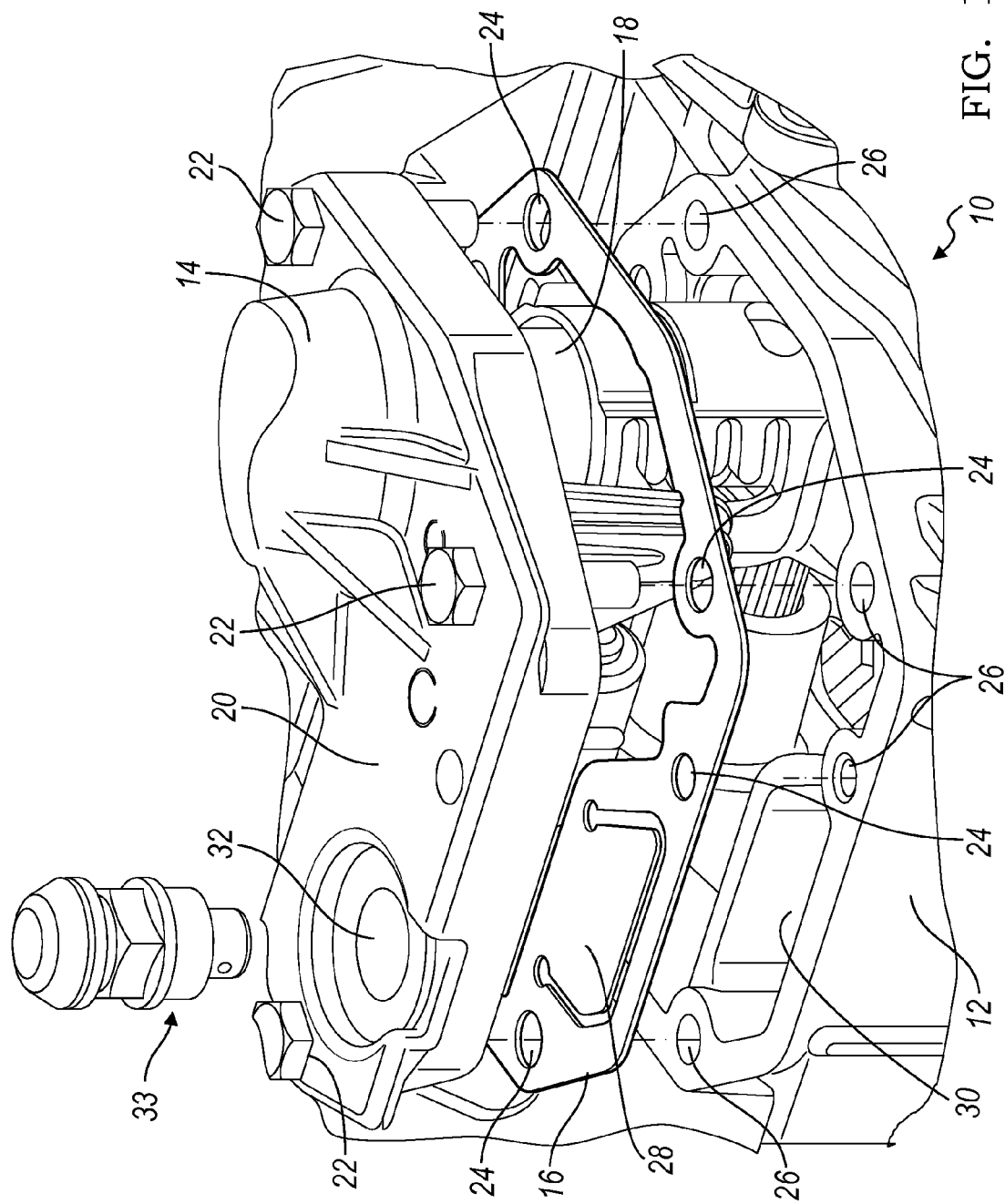
FIG. 1 is a partial expanded view of a transmission shift tower assembly with a gasket in accordance with the present invention.

Referring now to the drawings, a shift tower assembly embodying the principles of the present invention is illustrated in FIG. 1 and designated at 10. The shift tower assembly 10 includes a tower housing 14 with a generally flat plate 20 that is positioned on a transmission housing 12 of a manual transmission for a motor vehicle. A gasket 16 is positioned between the plate 20 and the tower housing 14 to form a seal, which prevents leakage of hydraulic fluid, such as oil, from the transmission. The plate 20 can be attached to the transmission housing 12 by one or more fasteners, such as, for example, threaded fasteners 22, which extend through one or more openings 24 of the gasket 16 and are threaded into a set of threaded holes 26. A shaft 18 extends through the tower housing 14 and into the transmission housing 12. The shaft 18 is supported by the tower housing. It connects the gear shift lever into the passenger compartment and the internal selection and engagement systems.

When a shift change is selected, a driver moves the gear shift lever which is coupled to the shaft 18 with, for example, one or more cables. In turn, the shaft 18 pivots which results in a desired gear selection of a set of gears within the transmission housing 12.

During the operation of the transmission, heat is generated within the transmission housing 12. To maintain a suitable, low operating temperature, the generated heat is removed by circulating a heat transfer medium, such as hydraulic fluid, around the components in the transmission housing 12. The hydraulic fluid can be pressurized or unpressurized (as in the present illustrated arrangement) and may be, as indicated above, some type of oil. As the hydraulic fluid within in the transmission housing 12 is circulated to dissipate heat and to lubricate the various components within the transmission, expanded heated air is pushed into a minor chamber 30 within the transmission housing 12 which has an opening 32. The opening 32 communicates with a vent 33 in the plate 20. As such, heat, as well as pressure buildup, within the transmission can be dissipated through the vent 32.

Figure 2:
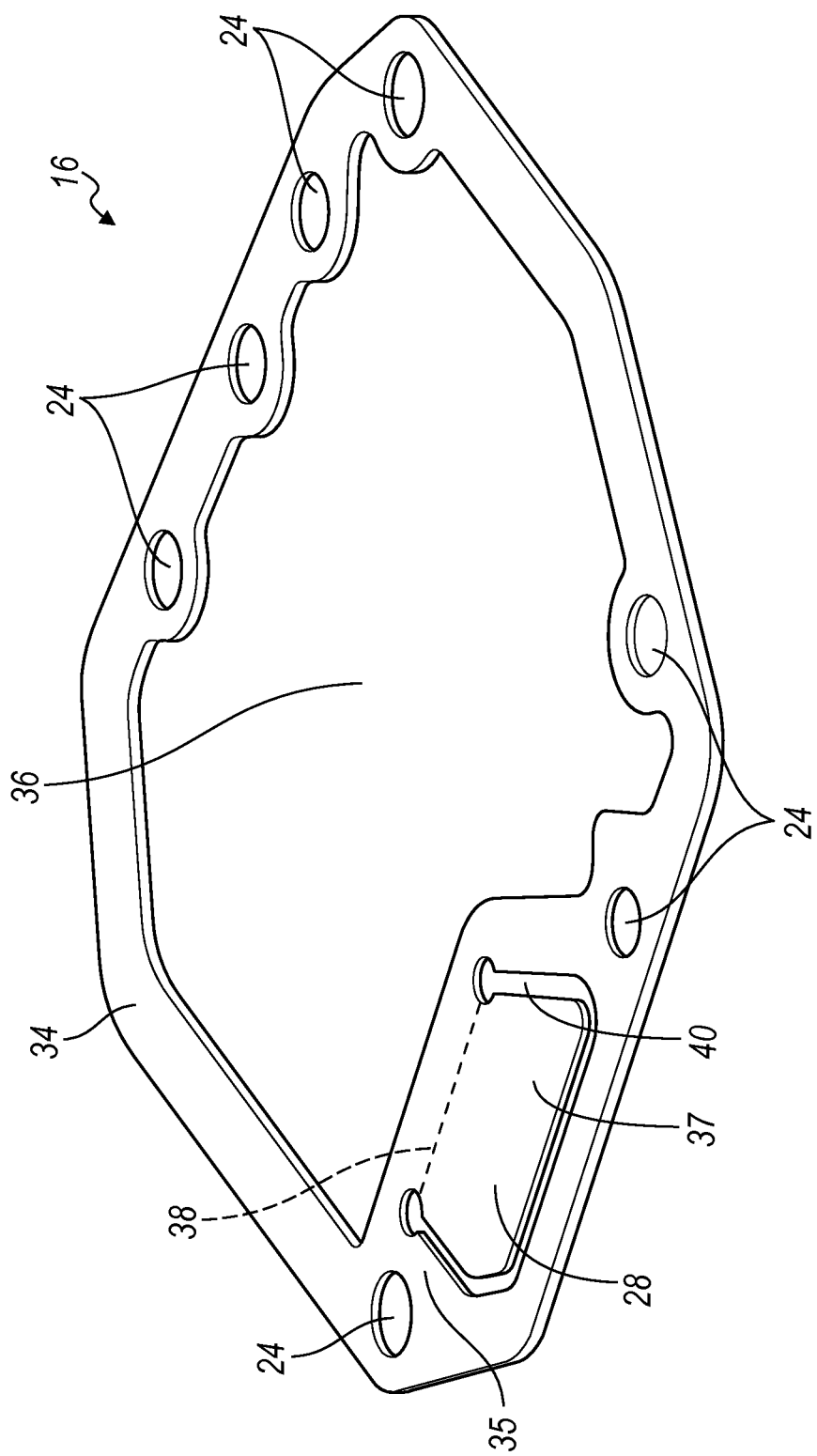
FIG. 2 is a perspective view of the gasket shown in FIG. 1.

In accordance with the principles of the present invention, the gasket 16 includes a baffle 28 that allows heat and pressure to dissipate through the vent 33 but prevents hydraulic fluid from splashing out of the vent 33 as the hydraulic fluid is being circulated within the transmission housing 12. Turing to FIG. 2, the gasket 16 includes an outer band 34 which defines an inner opening 36 through which the shaft 18 extends. The openings 24 which facilitate securing the plate 20, the gasket 16 and the transmission housing 12 together are distributed along the band 34. The band 34 also includes an enlarged portion 35 in which the baffle 28 is located. The baffle 28 includes a flap portion 37 connected to the enlarge portion 35 of the band 34 along a segment 38. The flap portion 37 is shaped such that a gap 40 is defined between the flap portion 37 and the enlarged portion 35. Specifically, the gap 40 extends along the outer perimeter of the flap portion 37 that is not connected to the enlarged portion 35 as shown in FIG. 2.

Figure 3:
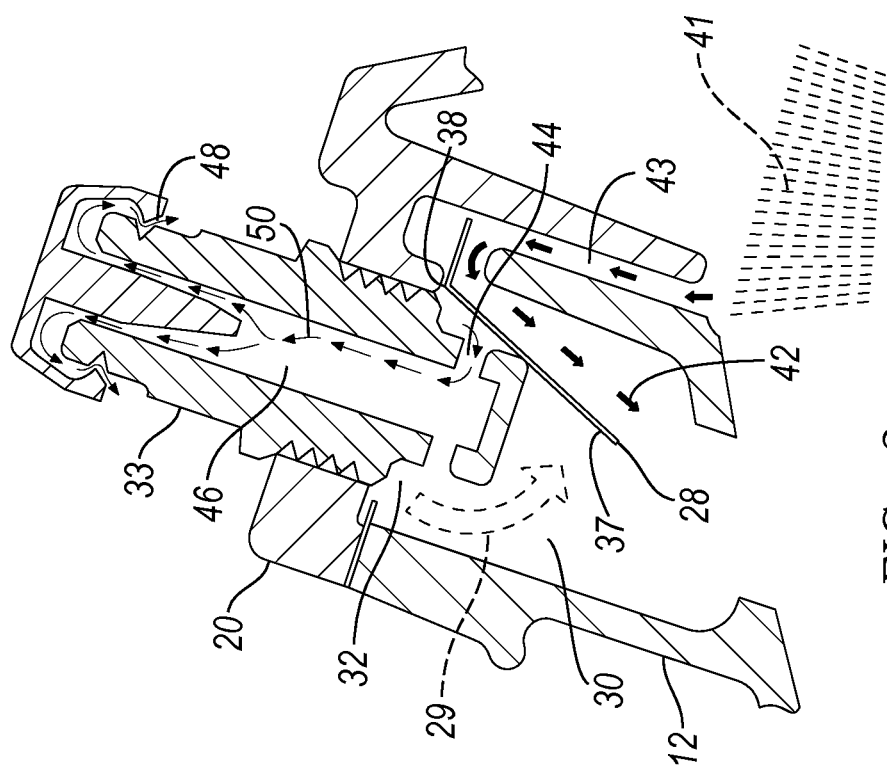
FIG. 3 is a closeup view of the gasket positioned in the transmission shift tower assembly.

Referring to FIG. 3, as the transmission is in operation, heat and/or pressure buildup can be dissipated from the vent 33 through the opening 32 and the gap 40, since the gap 40 provides a path from the opening 32 to the vent 33. The gap 40, however, is narrow enough and positioned in such way to prevent or minimize hydraulic fluid from escaping past the flap portion 37 through the vent 33. As the hydraulic fluid (as indicated by a splash pattern 41) is being circulated within the transmission housing 12, some of the hydraulic fluid enters into a channel 43 that communicates with the chamber 30. Without the use of the baffle 28, some of the hydraulic fluid enters into the vent 33 through openings 44. The hydraulic fluid is then pushed through a bore 46 and out of exit openings 48. The fluid pattern into the vent 33 when the baffle 28 is not employed is indicated by the arrows 50, indicating leakage of the hydraulic fluid through the openings 48 of the vent 33.

When the vent 33 is assembled onto the plate 20, it slightly moves the flap portion 37 (as indicated by the arrow 29), which bends along the segment 38 in such a manner that it deflects the hydraulic fluid directly into the chamber 30 and from entering into the openings 44 of the vent 33, as indicated by the arrows 42. Hence, the baffle 28 is able to keep the hydraulic fluid within the transmission housing 12 during the operation of the transmission.

In various arrangements, the gasket 16 can be made of a fibrous material, such as, for example, paper, or any other suitable material. A knife with the desired contours of the gasket 16 can be employed to form the gasket 16. One of more gaskets 16 can be made with such a knife in a manufacturing operation, such as, for example, a stamping operation. The thickness of the gasket in various arrangements is between about 0.4 mm and about 0.8 mm. Further, in various arrangements, the gap 40 is about 2 mm.

The description of the invention is merely exemplary in nature and variations that do not depart from the gist of the invention are intended to be within the scope of the invention. Such variations are not to be regarded as a departure from the spirit and scope of the invention.

What is claimed is:

1. A motor vehicle transmission comprising:
   a transmission housing;
   a shift tower housing configured for mounting to the transmission housing;
   a gasket with an outer band that defines an inner open region, the outer band having an enlarged portion; and
   a baffle located in the enlarged portion, the gasket being disposed between the transmission housing and the tower housing, the baffle including a flap portion connected to the enlarged portion along a segment, the flap portion being deflected into a minor chamber of the transmission housing by the positioning of a vent in an opening of the tower housing such that the flap portion is moved away from the opening, the vent communicating with the minor chamber,
   wherein heated air and pressure buildup in the minor chamber is dissipated through exit openings of the vent, and
   wherein the positioning of the flap in the minor chamber deflects hydraulic fluid into the minor chamber away from the vent such that the baffle prevents or minimizes the escape of hydraulic fluid from the transmission through the vent during the operation of the transmission.

2. The transmission of claim 1 wherein the baffle includes a gap that enables the release of heat from the transmission housing.

3. The transmission of claim 1 wherein the gasket forms a seal between the shift tower housing and the transmission housing.

4. The transmission of claim 1 wherein the flap portion and the enlarged portion define a gap that extends around the flap portion that is not connected to the enlarged portion along the segment.

5. The transmission of claim 4 wherein the gap is about 2 mm.

6. The transmission of claim 1 wherein the thickness of the gasket is between about 0.4 mm and about 0.8 mm.

7. The transmission of claim 1 wherein the baffle enables the release of pressure buildup within the transmission housing.

8. The transmission of claim 1 wherein the gasket is made of a fibrous material.

9. The transmission of claim 8 wherein the fibrous material is paper.

* * * * *